United States Patent

Boehling et al.

[19]

[11] Patent Number: 5,819,050
[45] Date of Patent: Oct. 6, 1998

[54] AUTOMATICALLY CONFIGURABLE MULTI-PURPOSE DISTRIBUTED CONTROL PROCESSOR CARD FOR AN INDUSTRIAL CONTROL SYSTEM

[75] Inventors: Warren A. Boehling, N. Attleboro; Alan Morton Foskett, Mansfield; Alan Reid Wheeler, Raynham, all of Mass.

[73] Assignee: The Foxboro Company, Foxboro, Mass.

[21] Appl. No.: 609,089

[22] Filed: Feb. 29, 1996

[51] Int. Cl.⁶ .................................................. G06F 15/173
[52] U.S. Cl. ............................................................ 395/284
[58] Field of Search ........................... 364/132, 147, 364/180, 181; 395/200.1, 284, 497.01–497.04, 828–834, 651–653

[56] References Cited

U.S. PATENT DOCUMENTS

| | | | |
|---|---|---|---|
| 4,750,150 | 6/1988 | Weppler | 395/828 |
| 4,764,868 | 8/1988 | Ketelhut et al. | 395/832 |
| 4,788,657 | 11/1988 | Douglas et al. | 395/284 |
| 4,803,623 | 2/1989 | Klashka et al. | 395/828 |
| 4,870,564 | 9/1989 | Ketelhut et al. | 395/832 |
| 4,933,845 | 6/1990 | Hayes | 395/284 |
| 5,006,842 | 4/1991 | Tobol | 340/825.34 |
| 5,081,297 | 1/1992 | Lebel et al. | 395/284 |
| 5,537,607 | 7/1996 | Ploger, III | 395/830 |
| 5,594,874 | 1/1997 | Narayanan et al. | 395/284 |
| 5,613,061 | 3/1997 | Taylor | 395/183.06 |
| 5,615,344 | 3/1997 | Corder | 395/309 |

*Primary Examiner*—Lance Leonard Barry
*Attorney, Agent, or Firm*—Leydig, Voit & Mayer, Ltd.

[57] ABSTRACT

A configurable distributed control processor card for use in an industrial process control system is described. The configurable distributed control processor card includes configuration determination logic for designating a particular intended distributed control processor card configuration based upon a signal, originating from an external bus, sensed on one or more input pins to the configurable card. The configuration determination logic specifies one of a set of distributed control processor card configurations based upon the sensed signal.

A configurable distributed control processor card also includes card configuration logic. Based upon the specified configuration, a control program is selected from a set of control programs associated with the distinct ones of the set of distributed control processor card configurations. Furthermore, the input leads to the configurable distributed control processor card are selectively routed to inputs of a processor mounted upon the configurable distributed control processor card.

17 Claims, 4 Drawing Sheets

SMI Architecture

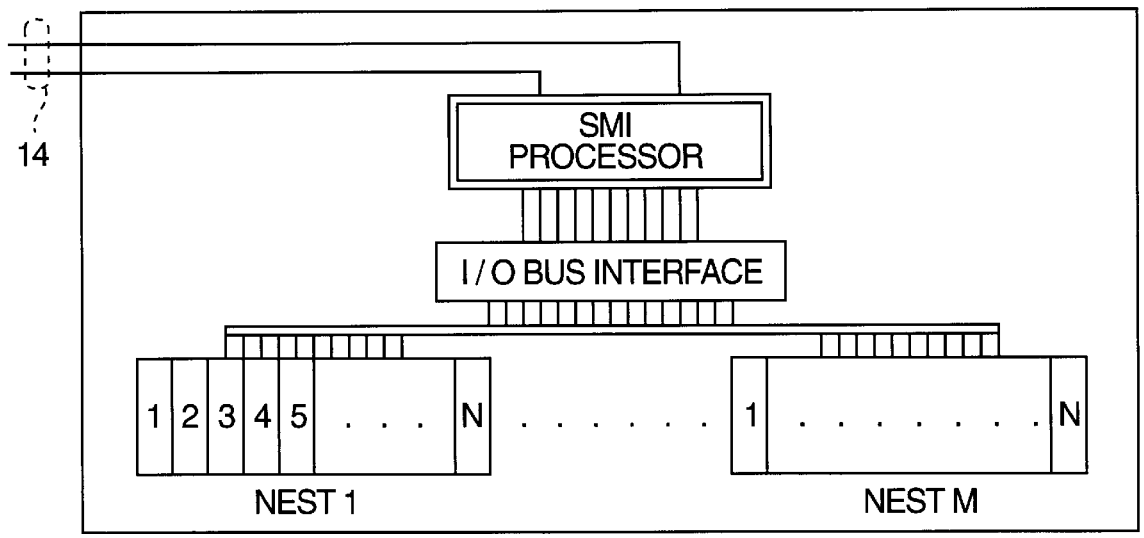

Spectrum product : U10  UCM  FIO  UFM
Slots/Nest (N)  :  10   10   8    12
Nests/Groups (M):  3    3    16   8

Basic Module Design

FIG. 2

|      | UCM      | UFM      | UIO      | FIO      |
|------|----------|----------|----------|----------|
| Int0 | Pin 5    | Pin 5    | INT2HZ   | Pin 7    |
| Int1 | Pin 6    | Not Used | Not Used | Pin 6    |
| Int2 | Pin 3    | Not Used | Not Used | Pin 3    |
| Int3 | Not Used | Not Used | Pin 56   | Pin 63   |
| Int4 | USC CHIP | USC CHIP | USC CHIP | USC CHIP |
| Int5 | Not Used | Not Used | Pin 54   | Not Used |
| Int6 | Not Used | Not Used | Not Used | Not Used |
| Int7 | Not Used | Not Used | Not Used | Not Used |

Interrupt Signal Steering

FIG. 5

SMI Architecture

AUTOMATICALLY CONFIGURABLE MULTI-PURPOSE DISTRIBUTED CONTROL PROCESSOR CARD FOR AN INDUSTRIAL CONTROL SYSTEM

AREA OF THE INVENTION

This invention relates generally to distributed computerized control of complex industrial processes, and more particularly to distributed process controller hardware and the replacement and upgrade thereof.

BACKGROUND OF THE INVENTION

There are a number of industries which have evolved to integrate complex industrial processes with distributed computerized control systems for those processes. Two such examples are the oil refining industry and the power generating industry. Both have plants which are in general distributed, but the separate elements of which, by necessity, require highly integrated control.

These industrial control systems have evolved to include distributed control processors at localized industrial equipment sites. The distributed control processors communicate with industrial process control hardware in the system and, to a lesser degree, with one or more control system operator consoles at a central operating station. The control processors also communicate directly with industrial process equipment such as pumps and furnaces.

A particularly successful distributed processor control system, the SPECTRUM system, has been developed and provided for a number of years by The Foxboro Company. The SPECTRUM system presently includes a number of distributed interface processor module types including a Unit Control Module (UCM), Field Input/Output System (FIO), Universal Input/Output System (UIO), and Universal Field Multiplexer (UFM).

The Unit Control Module (UCM) consists of a set of up to thirty (30) separate analog and/or digital input and/or output cards arranged within three I/O nests having up to 10 cards each. The I/O cards are communicatively coupled to a pair of distributed control processors operating in a primary and backup (redundant) configuration. The distributed control processors, as will be known to those skilled in the art, execute control schemes and control communication with the I/O cards.

The Field Input/Output system (FIO) consists of a set of up to 128 separate analog and/or digital input and/or output cards arranged within eight I/O nests having up to 16 cards each. The I/O nests are communicatively coupled to a distributed control processor. The processor adjusts and linearizes signals received from and transmitted to the I/O nests to the extent needed in accordance with the FIO's primary task of providing an interface between the I/O nests and components of a SPECTRUM industrial process control system.

The Universal Input/Output system (UIO) consists of a set of up to thirty (30) separate analog and/or digital input and/or output cards arranged within three I/O nests having up to 10 cards each. The I/O cards are communicatively coupled to a distributed control processor which performs a primary task of providing an interface for communicating information between the I/O cards and components of a Spectrum industrial process control system.

The Universal Field Multiplexer (UFM) consists of a set of up to 96 separate analog and/or digital input cards arranged within eight I/O nests having up to 12 cards each. The I/O nests are communicatively coupled to a distributed control processor. The processor adjusts and linearizes signals received from the I/O nests to the extent needed in accordance with the UFM's primary task of providing a uni-directional interface for receiving signals from the I/O nests and forwarding in signals to components of a SPECTRUM industrial process control system.

In addition, the SPECTRUM system includes operator interface stations Examples of such interface stations include the Videospec, Spectrum Multistation, and Fox 1A operator stations. These operator interface stations enable an operator to monitor the operation of the industrial process control system, and if necessary modify operating parameters of industrial process controllers.

The SPECTRUM system has been an extremely reliable system, indeed many of the systems have been in operation for nearly 15 years, and some new installations are being constructed. The network protocols provide reliable communication channels between the geographically distributed system components. However, the SPECTRUM network is proprietary and, as a result, is not compatible with open network architectures and equipment within such networks. Connecting non-SPECTRUM equipment to the SPECTRUM system requires a special purpose gateway device through which the proprietary network communicates to the non-SPECTRUM equipment.

As a result of tremendous improvements in the area of computer technology, new distributed control systems have been devised. Some distributed control systems now incorporate improved communication network architectures and their related network communication protocols. One such example is the well known Nodebus Local Area Network (LAN) architecture. The Foxboro Company has produced a more recent offering, known as the I/A SERIES (Registered Trademark of The Foxboro Company) industrial process control systems which incorporate the Nodebus LAN architecture. The distributed control processors of the I/A SERIES industrial control systems communicate at a local level to a set of special purpose nodes by field buses, and communicate with other control processors and central workstations over the Nodebus LAN. The open system architecture of the I/A SERIES system facilitates communication with non-proprietary equipment.

Like the SPECTRUM system, the I/A SERIES system is software driven and distributed. However, unlike the SPECTRUM system, software can be downloaded to the individual control processors at the distributed locations. As a result, modifications to the control algorithms driving special purpose control hardware, to which the distributed process controllers are attached, are relatively easy to accomplish.

Despite the high quality and proven reliability of the SPECTRUM system, there are a number of reasons for migrating from the SPECTRUM system to the I/A SERIES system for controlling industrial processes. The I/A SERIES industrial process control systems provide superior processing capabilities. More particularly, I/A SERIES systems include vastly superior computer processor and memory hardware which have been developed since the SPECTRUM system was initially designed and installed in various industrial plants. Newer processing units incorporated within I/A SERIES systems are capable of making computations at rates many times greater than the rate of the previously used SPECTRUM system processing units. Improvements to primary memory storage allow for more information to be directly addressed by the central processors. In addition, the I/A SERIES industrial process control systems employ the improved Nodebus LAN architecture. I/A SERIES systems also include state-of-the-art operator workstations having improved displays and graphical user interfaces. The new computer hardware is not only superior in certain respects to the old SPECTRUM system hardware, it is also relatively less expensive.

However, even in view of the above described advantages to the new industrial process control system, a strong sense of comfort by customers in a proven SPECTRUM system and a desire to have assurance that the new system will perform as well as the original SPECTRUM system weighs heavily against replacing the SPECTRUM system hardware by the improved current industrial process control hardware. A highly significant factor which frustrates attempts to replace a SPECTRUM system by an I/A SERIES system is that the industrial process subject to the SPECTRUM system control very often cannot be shut down without incurring a tremendous expense. It is reasonable to assume that in many instances it would be unacceptable to discontinue an industrial process for a day (or even an hour) in order to replace a SPECTRUM system. For example, if the control system were operating an oil refinery, one would anticipate a tremendous loss in raw materials and unacceptable production during the course of shutting the refinery down, then returning it to operation and stabilizing it after the upgrade. Therefore, absent a scheduled shutdown of the SPECTRUM system (an extremely rare occasion), it is not likely that a customer will seek to replace the present SPECTRUM system.

SUMMARY OF THE INVENTION

It is therefore a general object of the present invention to provide a simple, economical means for replacing and upgrading existing specific-use processor module cards.

It is another, more specific, object of the present invention to replace a set of special purpose distributed control processor cards, having different signal interfaces and functions, by a configurable, multi-purpose card design which, to the extent possible, takes advantage of hardware, firmware and software similarities between the special purpose distributed control processor cards.

These objects, as well as other objects, are met by a configurable distributed control processor card embodying the present invention. The configurable distributed control processor card includes configuration determination logic for designating a particular intended distributed control processor card configuration based upon one or more signals sensed on one or more input pins to the configurable card. The sensed signals originate from an external bus to which the configurable distributed control processor card is communicatively coupled via a connector. The configuration determination logic specifies one of a set of distributed control processor card configurations based upon the sensed signals.

In accordance with the card configuration specified by the configuration determination logic, the configurable distributed control processor card assumes one of the set of distributed control processor card configurations based upon the sensed signals. In accordance with the specified configuration, a control program is selected from a set of control programs associated with the distinct ones of the set of distributed control processor card configurations.

The configurable distributed control processor card includes a set of external leads for establishing signal contact with a complimentary set of leads communicatively coupled to an external bus for carrying I/O signals between the configurable distributed control processor card and other components of a distributed industrial process control system. In an embodiment of the present invention, configuration control logic on the configurable distributed control processor card sets up a processor signal configuration state for routing signals between computing hardware on the configurable distributed control processor card and the set of external leads of the configurable processor module card in accordance with the specified processor card configuration.

As a consequence of the above noted configurability feature provided by the configurable distributed control processor card, replacement of existing distributed processor cards having distinct pinout configurations by the single configurable distributed control processor card is accomplished without any modification to the previously existing bus architectures (both logical and physical) to which the various distinct distributed control processor cards interface. Furthermore, because the configurable distributed control processor card does not assume a particular identity until inserted within a distributed control system, only one type of "spare" distributed processor card is needed. As a consequence, the quantity of "spare" distributed processor cards needed for a particular installation is typically reduced.

An example of a potential application of the processor card described herein is in association with the performance of an on-line upgrade of a previously existing control system. Such an application is described in Boehling et al. U.S. application entitled "On-Line Replacement Of An Industrial Control Processor Module Via Loop-By-Loop Transfer Of Control Blocks" filed on Feb. 29, 1996, which has been assigned Ser. No. 08/609,603 the entire teachings of which are expressly incorporated herein by reference.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 2 is a schematic diagram illustrating a Spectrum Migration Integrator;

FIG. 5 is a chart illustrating the selective routing provided by the steering logic in order to route interrupt signals from the external leads on the multiple configuration processor card to the proper programmable interrupt inputs of a central processing unit on the processor card.

DETAILED DESCRIPTION OF THE PREFERRED EMBODIMENT

Figure 1:
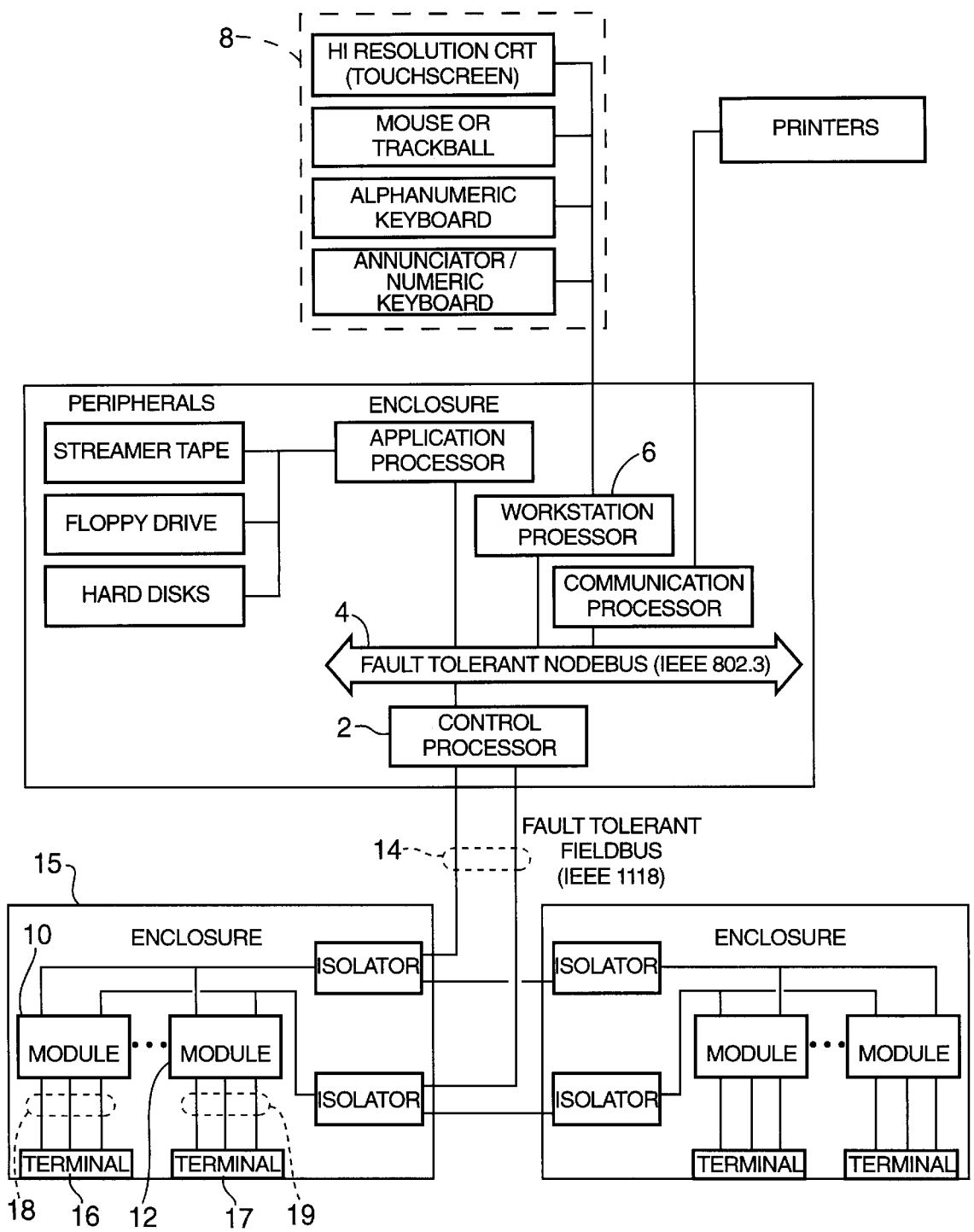
FIG. 1 is a high level schematic diagram of an exemplary industrial process control system wherein a configurable processor card embodying the present invention is employed.

Turning to FIG. 1, a schematic block diagram is provided of an illustrative distributed industrial process control system. In particular, a control processor 2 communicates with various interface, I/O, and information storage devices as illustrated in FIG. 1 via a LAN Bus 4. Also connected to the LAN Bus 4 is a Workstation Processor 6 and associated user interface devices 8 facilitating monitoring operations of the control processor 2 and industrial processes monitored and controlled by the control processor 2. It is noted that while only a single control processor (control processor 2) is included in the illustrative industrial process control system in FIG. 1, in alternative embodiments of the invention, a number of control processors are provided.

The control processor 2 is connected via a redundant bus 14 (comprising a Bus A and Bus B) to distributed interdistributed interface processor modules 10 and 12 (illustrated in more complete detail in FIG. 2). An enclosure 15 houses the processor modules 10 and 12 thus protecting the electronic circuitry and providing a means for communicatively coupling I/O lines from terminal equipment (not shown) to the processor modules 10 and 12 via terminals 16 and 17 of well-known design. The terminals 16 and 17 are signally coupled to the processor modules 10 and 12, respectively, via lines 18 and 19. The distributed interface processor modules 10 and 12 receive state information provided by sensors located upon or within terminal equipment (not illustrated) associated with industrial processes. The terminal equipment sensors transmit data to terminals on a module enclosure 15 which houses the distributed interface processor modules 10 and 12.

As will be known to those skilled in the art, the distributed interface processor modules 10 and 12, in conjunction with the control processor 2, analyze status information from the terminal equipment sensors and, in response transmit appropriate control signals to the terminal equipment in order to maintain controlled operation of the industrial processes with which the terminal equipment is associated. While not shown in FIG. 1, the types of terminal equipment coupled to the distributed processor modules include industrial equipment such as that utilized in oil refining, chemical manufacturing, and electrical energy generation plants.

Four distinct distributed control processor card types are utilized within various distributed interface processor module configurations in the known SPECTRUM system. The selection of a particular distributed control processor card type and module configuration is based upon a particular purpose for the module and the type of installation within which processor module is to be used. The UCM distributed control processor card is included in a distributed interface processor module configuration wherein the UCM card is inserted into a connector communicatively coupling the UCM card to a UCM processor bus which interfaces the UCM card to up to 30 I/O cards. The UIO distributed control processor card is included in a distributed interface processor module wherein the UIO card is inserted into a connector communicatively coupling the UIO card to a UIO processor bus which interfaces to a maximum of 30 I/O devices for monitoring and issuing control signals to industrial equipment associated with an industrial process.

In the case of a UFM distributed interface processor module configuration, a UFM distributed control processor card is mounted upon a UFM mother card which in turn communicatively couples the UFM distributed control processor card to a UFM Rack Bus to which a maximum of 96 I/O cards are coupled. Finally, an FIO distributed interface processor module configuration comprises an FIO distributed control processor card which interfaces an FIO Rack Bus to which up to 128 I/O cards are connected.

The above described connection schemes for distributed interface processor modules (such as modules 10 and 12 in FIG. 1) are schematically depicted in FIG. 2. In the case of UIO and UCM distributed interface processor modules, a UIO or UCM processor card communicates with a maximum of three I/O card nests having a maximum capacity of 10 I/O cards each. An FIO distributed interface processor module comprises an FIO distributed control processor card and interface hardware for interfacing a maximum of 16 I/O card groups (1 or 2 groups per nest) having a maximum capacity of 8 I/O cards each. Finally, a UFM distributed interface processor module comprises a UFM distributed control processor card and interface hardware for interfacing a maximum of 8 input card nests having a maximum capacity of 12 input cards each.

Previously, separate and distinct distributed control processor card types have been used in the well-known SPECTRUM control system. Each distinct card type is associated with one of the four distributed interface processor module configurations described above. However, in an embodiment of the present invention, each of the four distinct processor module configurations are supported by a single, configurable, SPECTRUM Migration Integrator (SMI) card. The SMI card is capable of replacing each of the four previous specific use processor cards having distinct signal interfaces without re-wiring or otherwise modifying the interface hardware connections between the distributed control processor card and an associated I/O bus interface provided by external bus connectors.

External input and output leads (or "pinouts") of the SMI card embodying the present invention are selectively routed by logic circuitry on the SMI card based upon automatically sensing one of the four above described SPECTRUM distributed control processor card configurations. A technician replacing a SPECTRUM processor module card by the SMI card need not know the type of card being replaced since the SMI card identifies the intended card configuration and automatically configures internal buses and other hardware on the SMI card according to the identified card configuration. The above described simplified replacement procedure significantly reduces the opportunity for operator error when replacing an existing card by an SMI card.

Furthermore, while the need for spare processor cards remains even after the SMI card is designated as a replacement card for specific use SPECTRUM cards, the actual number of spare processor cards is likely reduced since only one type of replacement card (the SMI card) is needed. Also, in an emergency, a less critically needed SMI processor module card (such as a redundant backup processor module) can be pulled from another site and replaced at a failed critical site. Other significant advantages associated with the automatically configurable SMI processor module card will be known to those skilled in the art.

Figure 3:
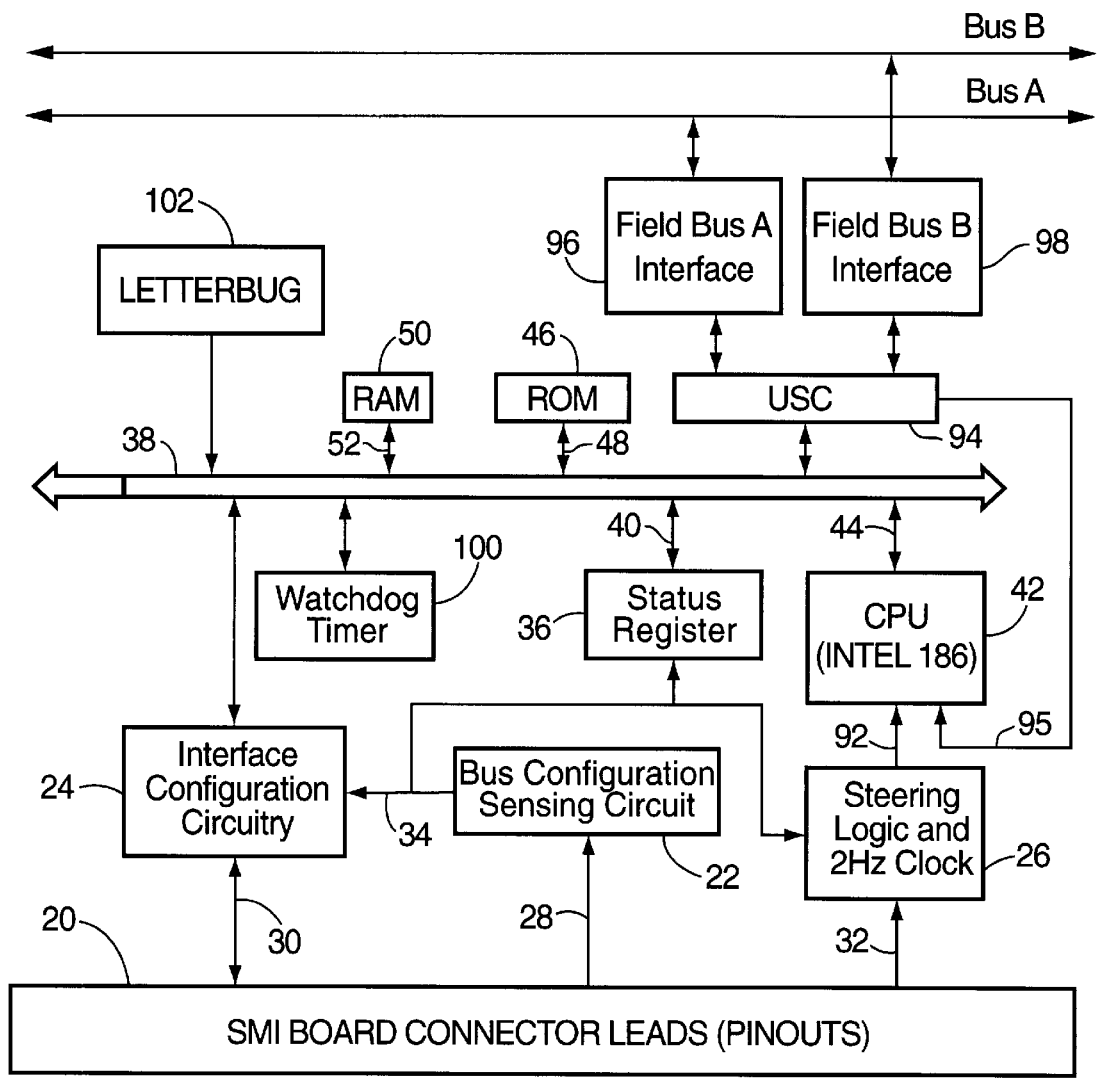
FIG. 3 is a schematic diagram of a multiple configuration processor card embodying the present invention, where the multiple configuration processor card includes a bus configuration sensing circuit and a set of output signals indicating one of a number of possible configurations to be used by the configurable processor card in view of a set of bus signals sensed by the bus configuration sensing circuit.

Turning now to FIG. 3, a schematic block diagram is provided of the primary components of a SPECTRUM Migration Integrator (SMI) card embodying the present invention. The SMI card interfaces an external bus via a set of conductive leads (or "pins") 20 which contact a set of corresponding conductive leads in a connector when the SMI card is inserted into the connector. Depending upon the type of distributed interface processor module within which the SMI card is inserted (UCM, UIO, UFM, or FIO), the connector is communicatively coupled to a back plane rack bus or a motherboard which, in turn, is inserted within a back plane rack bus connector. In particular, with respect to the UCM and UIO configurations, the SMI card is directly inserted into a rack bus connector. In the case of the UFM configuration, the SMI card is mounted upon a motherboard upon which a specific purpose UFM distributed processor card was previously mounted. The UFM motherboard in turn is inserted within a UFM rack bus connector.

The size of connector edge of the specific purpose FIO card, unlike the other specific purpose distributed processor cards that the SMI replaces, is not the same size as the SMI card. Instead, the SMI card is smaller than the specific purpose FIO card. Rather than create a unique SMI card having the same dimensions as the special purpose FIO processor card, an FIO motherboard has been constructed that has the same size connector edge as the special purpose FIO processor card in order to communicatively couple the SMI card to the FIO rack bus connector. The SMI card is mounted upon the FIO motherboard, which in turn is inserted into an FIO rack bus connector.

Continuing with the description of FIG. 3, the set of pins 20 are communicatively coupled to a Bus Configuration Sensing Circuit 22, Interface Configuration Circuitry 24, and Steering Logic 26 via conductive lines 28, 30 and 32 respectively on the SMI card. When the SMI card is inserted into the connector, the Bus Configuration Sensing Circuit 22 senses the polarity of external bus signals transmitted from the pins 20 on the lines 28. In a particular embodiment of the present invention, the lines 28 correspond to pins 53, 76 and 78 of the set of pins 20. Thereafter, configuration determination logic, comprising combinational circuits, within the Bus Configuration Sensing Circuit 22 decode the signals on lines 28 in order to identify a particular intended distributed control processor card configuration. A set of signals transmitted by the Bus Configuration Sensing Circuit 22 on lines 34 specify a particular identified one of the four possible SMI card configurations.

In the preferred embodiment of the present invention, the lines 34 comprise four separate signal lines. Each separate one of the lines 34 specifies a particular one of the four different processor card configuration by means of a high signal level on a corresponding line of the signal lines 34. In other embodiments of the invention where the number of possible configurations is larger, more sophisticated encoding may be used to specify a card configuration type. For example, in an alternative embodiment using binary encoding, four type designation bits may be used to specify up to sixteen (16) different configuration types.

The lines 34 are routed to a number of components on the SMI card. In particular, the lines 34 are connected to four input pins on a status register 36. The status register 36 stores values on the lines 34 as four status bits for later reference. The status register 36 is communicatively coupled to an internal bus 38 via lines 40. The four status bits, indicating the processor module configuration type, are read by a CPU 42 (e.g., INTEL 80C186EC), connected to the internal bus 38 via lines 44, in order to perform software and firmware setup procedures corresponding to the designated processor module configuration type.

In particular, a Power On Self Test is performed by the CPU 42 in order to enable appropriate interrupts based upon the configuration specified by the four bits in the status register 36 determined by input signals on the lines 34. In addition, the SMI card performs specific diagnostic self-tests that ensure that the interface logic and existing SPECTRUM security logic are functioning properly. Also, the operating firmware sets up data structures for a scanner module (for polling connected I/O devices) which includes the I/O card addresses for each one of four distinct SMI card configurations. For example, the UCM configuration uses addresses 0×FC80 through 0×FCFB, and the UIO configuration uses addresses 0×40 through 0×7B.

The SMI card includes a 512K×16 bit read only memory (ROM) 46 which is communicatively coupled to the internal bus 38 via lines 48. It is noted that each SMI card contains, within the ROM 46, configuration specific routines and data for each of the various SMI card configurations. Therefore in response to the designation of a particular processor module type, the CPU 42 need only set pointer values to access configuration appropriate control programs contained within pre-stored firmware "burned" into the ROM 46. It is thus not necessary to download these control programs and data from an external source, such as the control processor 2. In addition to the above described firmware, the ROM 46 includes general startup instructions. Such instructions includes in a particular embodiment of the present invention, an instruction causing the status register 36 to load the signals on lines 34 from the Bus Configuration Sensing Circuit 22 into four status register bits.

Because the SMI card is used in a wide variety of environments and interface to (currently) 98 different I/O card types, it is not always possible for the software to uniquely identify the exact I/O card types by interrogating the connected I/O cards in a distributed interface processor module containing the SMI card. It is therefore necessary to provide the I/O card type information to an inserted SMI card so that the SMI card will properly interface the I/O cards in the distributed interface processor module and properly convert data associated with the various attached I/O cards. Such I/O card configuration data is downloaded from the Control Processor 2 to the distributed interface processor module (e.g. module 10) via the redundant bus 14 during startup configuration of the SMI card. The I/O card configuration data is stored in random access memory (RAM) 50 coupled to the internal bus 38 via lines 52.

In addition to the status register 36, the lines 34 are communicatively coupled to the Interface Configuration Circuitry 24. Based upon the received signals on lines 34, the Interface Configuration Circuitry selectively routes address, data, and control signals from the pins 20 of the SMI card to the internal bus 38 via a set of lines 54, as well as other I/O related components of the SMI card which are described below.

Address data line configuration circuitry

Figure 4:
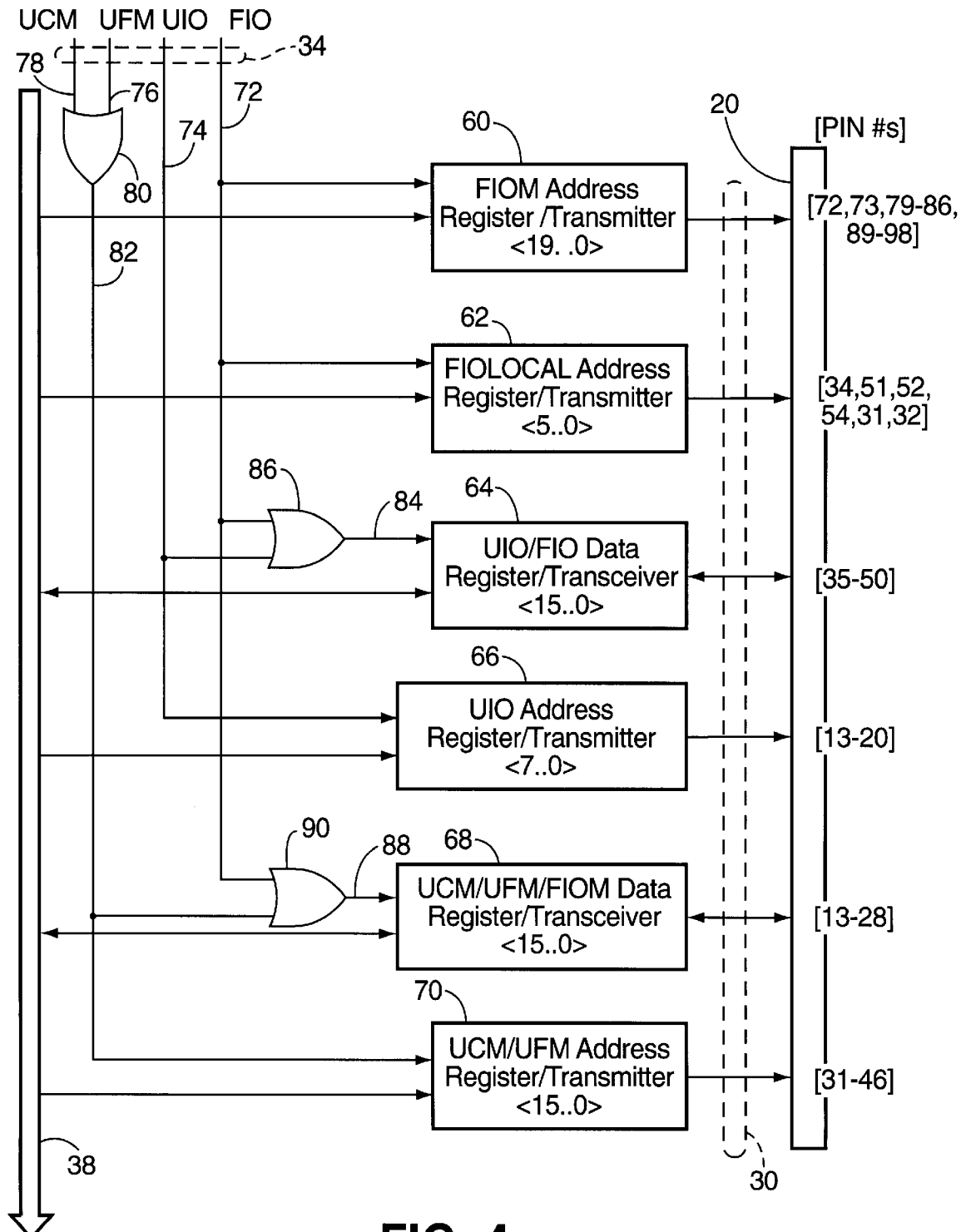
FIG. 4 is a schematic diagram of interface configuration circuitry for address and data lines in accordance with an illustrative embodiment of the present invention, and in particular, a set of registers/transmitters and registers/transceivers which are selectively enabled in order to couple external leads on the multiple configuration processor card to an internal bus on the processor card.

Turning to FIG. 4, a schematic drawing is provided of a portion of the Interface Configuration Circuitry 24 for routing address and data lines between the internal bus 38 and the pins 20 of the SMI card via the lines 30. The signals on lines 34 selectively enable a set of interface register/ transmitter/receiver circuits 60, 62, 64, 66, 68 and 70 in order to connect the data and address bus lines of the internal bus 38 to the set of pins 20 on the SMI Card via the lines 30. In FIG. 3, the lines 34 have been specifically re-numbered as lines 72, 74, 76 and 78 corresponding to the FIO, UIO, UFM and UCM configurations respectively. The data and address pins of the set of pins 20 on the SMI card are identical for the UCM and UFM configurations. Therefore, the lines 76 and 78 are logically "or'ed" by gate 80, and the resulting signal on line 82 is used to drive the enable inputs to corresponding bus interface circuitry.

Turning now to the specific groups of address and data routing configuration circuitry, the interface register/ transmitter 60 is enabled by (FIO) line 72 in order to store and transmit address signals from the internal bus 38 to pins 72, 73, 79–86, and 89–98 of the SMI card. Interface register/transmitter 62 which is also enabled by line 72, stores and transmits address signals from the internal bus 38 to pins 34, 51, 52, 54, 31, and 32 of the SMI card.

The interface register/transceiver 64 is enabled via line 84. The signal on line 84, which represents the logical or'ling of lines 72 and 74 by gate 86, is activated when either the UIO or FIO configuration is specified. The interface register/transceiver 64 stores, transmits and receives data signals via pins 35–50 of the SMI card.

The interface register/transmitter 66 receives enable signals on (UIO) line 74. The interface register/transmitter 66 stores and transmits address signals, received from the internal bus 38, to pins 13–20 of the SMI card.

The interface register/transceiver 68 receives enable signals on line 88. The signal on line 88, which represents the logical or'ling of lines 82 and 72 by gate 90, is activated when either the UCM, UFM or FIO configuration is specified by the Bus Configuration Sensing Circuit. The interface register/transceiver 68 stores, transmits and receives data signals via pins 13–28 of the SMI card.

The interface register/transmitter 70 receives enable signals on the (UCM/UFM) line 82. The interface register/transmitter 70 stores and transmits address signals, received from the internal bus 38, to pins 31–46 of the SMI card.

As a result of the above described circuitry, data and address signals are properly routed between various source pins of the set of pins 20 on the SMI card and the address data lines of the internal bus 38. Furthermore, the above description of address/data line configuration circuitry is intended to be illustrative of interface configuration circuitry within a configurable processor card. It will be appreciated by those skilled in the art that the above-described selective routing functions can be accomplished by other logic circuitry. For example, selectors may be used to selectively connect signals from multiple sources to a single output pin in accordance with a specified configuration. Still other variations will be known to those skilled in the art in view of the above described example of configurable address/data interface circuitry.

Handshake Control Configuration Circuitry

While not specifically shown in the drawings, yet another portion of the Interface Configuration Circuitry 24 configured in accordance with a distributed control processor card configuration specified by lines 34 is I/O handshake and sequencing logic controlled by, for example, an ALTERA 7032 electrically programmable logic device (EPLD). This device generates a well known CYINIT/CYAC handshake sequence used in the UCM and UFM processor module configurations of the SMI card. The CYINIT and CYAC signals are selectively routed, from the ALTERA 7032 handshake controller to pins 51 and 52 respectively of the SMI card, in accordance with combinational logic driven by the lines 34.

When the lines 34 designate the UIO processor module configuration, the Interface Configuration Circuitry 24 connects the input strobe DTIPEL of the ALTERA 7032 EPLD to pin 28 of the SMI card, and the output strobes DTOPEL and OPTXPL of the ALTERA 7032 EPLD to pins 27 and 29 respectively of the SMI card. In addition, when the UIO configuration is designated by the lines 34, the PCRSTL input strobe from the ALTERA 7032 EPLD and known external logic in the Interface Configuration Circuitry 24 is selectively coupled to pin 22 of the SMI card.

While most of the signals conditionally routed by the Interface Configuration Circuitry 24 have been described, yet other signals are conditionally routed between the pins of the SMI card and components on the SMI card via the Interface Configuration Circuitry 24 in accordance with the known pin configurations for each of the four distinct SPECTRUM processor module types. In view of the above description of illustrative selective configuration hardware, appropriate configuration logic circuits for carrying out selective routing of the remaining pin signals for each of the four processor module configurations would be known to those skilled in the art.

Steering Logic

Returning briefly to FIG. 3, the CPU 42 supports up to eight (8) programmable, maskable interrupt routines. Furthermore, some of the programmable interrupt routines are provided in more than one of the four SMI card configurations described above. However, the source of the interrupt signal to the CPU 42 corresponding to the common interrupts is not the same for each one of the various SMI card configurations. Notwithstanding the dissimilar input pins on the configurable SMI card for a particular interrupt routine, the SMI card design embodying the present invention exploits the commonality of interrupt procedures associated with the various SMI card configurations. This is accomplished by selectively steering input signals from a number of sources, including both the external leads of the SMI card (on lines 32) and signals generated by on-board hardware (the 2 Hz clock), to the appropriated maskable interrupt pins of the CPU 42 via lines 92. The steering logic 26 comprises simple combinational logic circuitry for selectively connecting certain ones of the maskable interrupt inputs of the CPU 42 to a particular selected interrupt signal source via input lines 92 based upon an SMI card configuration specified by signals on the lines 34.

Turning to the chart provided in FIG. 5, the routing function performed by the steering logic (and 2 Hz Clock) 26 is summarized. The INT0 input on the CPU 42 is associated with an interrupt routine for the end of a conversion pulse for analog to digital converters on attached I/O cards. The source of the INT0 input to the CPU 42, in the case of the UCM and UFM card configurations, is pin 5 of the SMI card. On the other hand, when the UIO card configuration is specified, the source of the same INT0 input for the CPU 42 is the INT2 Hz signal originating from a two hertz clock signal generated by an on-board UIO clock signal. In the FIO configuration, the INT0 input of the CPU 42 is connected to pin 7 of the set of SMI card leads. The steering logic portion of the steering logic and 2 Hz clock 26 selectively connects one of the three distinct possible input sources to the INT0 input of the CPU 42 via one of the eight interrupt input lines 92 based upon the particular SMI card configuration designated by signals on the lines 34 originating from the Bus Configuration Sensing Circuit 22.

The INT1 input is associated with an interrupt routine for the UCM data buffer card and FIO satellite interface cards. Like the INT0 input, the INT1 input source is dependent upon the SMI card configuration. The INT1 input source is the pin 6 external lead of the SMI card for the UCM and FIO card configurations. However, the programmed INT1 interrupt routine is not utilized in the UFM and UIO configurations and therefore is selectively connected by the steering logic 26 to ground when the UFM and UIO configurations are specified by the Bus Configuration Sensing Circuit 22.

The INT2 input is associated with an interrupt routine for the FIO satellite interface cards and UCM halt input. The INT2 input to the CPU 42 is selectively connected by the steering logic 26 to pin 3 of the SMI card for both the UCM and FIO card configurations and connected to ground (to disable the input) when the UFM and UIO configurations are specified.

The INT3 input is associated with an interrupt routine for the FIO satellite interface cards and the UIO nest power fail. The INT3 input to the CPU 42 is selectively coupled via the steering logic 26 to ground when either the UCM or UFM configuration is specified by the Bus Configuration Sensing Circuit 22. However, when the UIO configuration is specified, the INT3 input is selectively coupled via the steering logic 26 to pin 56 of the external leads. When the FIO configuration is specified, the INT3 input of the CPU 42 is coupled to pin 63 of the external leads.

The INT4 input is associated with an interrupt routine for the fieldbus communications interrupts associated with a universal serial controller chip. The INT4 input of the CPU 42 receives an interrupt signal from a universal serial controller (USC) chip 94 via line 95 in each of the four configurations. Therefore, no special logic circuitry is required, and the signal on line 95 from the USC chip 94 is passed directly to the INT4 input of the CPU 42.

The INT5 input is associated with an interrupt routine for the UIO flunk signal. The INT5 interrupt routine is only associated with the UIO configuration, and is connected to pin 54 of the external leads in this configuration. When the UCM, UFM and FIO configurations are specified, the INT5 input of the CPU 42 is coupled via pull-down resister circuits in the steering logic 26 to ground. The INT6 and INT7 are not used in any of the four configurations and are therefore grounded by pull-down resister circuits within the steering logic 26. As previously explained, the logic circuitry provided on the SMI card for carrying out the interrupt input selection scheme described above and summarized in FIG. 5 is straight forward and is a straight-forward circuit design task. Therefore, the actual circuitry comprising the steering logic 26 has not been illustratively depicted in detail. In another version of a UCM distributed processor card, yet another interrupt input pin configuration is utilized for the INT0, INT1, and INT2 interrupts. The configuration logic (hardware and/or software) accommodates the distinct pin configuration.

A and B bus connection

Returning again to FIG. 3, the SMI card, as shown in FIGS. 1 and 2, is communicatively coupled to the Control Processor 2 via Buses A and B. Communication on the Buses A and B is facilitated by the USC 94. The USC 94 is coupled to separate transceiver Bus interfaces 96 and 98 coupled respectively to Buses A and B. Such an interface would be well known to those skilled in the art.

Watchdog Timer

The SMI card also includes an external Watchdog Timer 100. The reset period for the external Watchdog Timer is 800 milliseconds. Therefore, if the external Watchdog Timer 100 does not sense a reset signal from the CPU 42 within the 800 ms. delay period, the Watchdog Timer emits a timeout signal. In the case of the UCM, UFM and FIO configurations, if a timeout occurs, then the Watchdog Timer transmits a one millisecond reset pulse to pin 55 of the SMI card. However, the connection of the reset signal from the Watchdog Timer 100 to pin 55 is disabled via the Interface Configuration Circuitry 24 when the UIO configuration is specified by lines 34.

Letterbug

The SMI card includes a Letterbug 102. The contents of the Letterbug 102 are read via lines 104 communicatively coupled to the internal bus 38 of the SMI card. As explained in detail in Tobol and Katz U.S. Pat. No. 5,006,842, the Letterbug 102 provides a hardware identity for the SMI card (as opposed to an address). When the SMI card is identified as a source or destination, the Letterbug 102 is specified rather than an address.

While many details have been provided regarding the hardware, firmware and software for carrying out the preferred embodiment of the present invention, it is noted that the SMI card includes a number of address, data and control lines facilitating reading and writing information from the above-described buses, registers and memory devices and for controlling various components on the SMI board. Such address, data and control lines are well known to those skilled in the art and therefore are not included in the above described illustrative block diagrams.

The SMI processor module card is intended to interface a wide variety of industrial process sensor equipment. Each of the different types of sensors is associated with a specific resistance or voltage range. In prior SPECTRUM processors, the digital output signal corresponding to the various voltage or resistance readings was limited to a value range between 0 and 4K. In order to maintain a high degree of granularity in the digital output value corresponding to an analog input signal, the voltage and resistance values were specifically mapped from varying ranges of input ohm or millivolt values to the 0 to 4K digital output value range. For example a first sensor device may provide a range of −10 to 10 mvolts. In such a case, a 0 millivolt sensor reading would correspond to a digital output value of approximately 2000. In a second sensor having a range of 0 to 10 mvolts, a same digital output value of 2000 would correspond to a sensor reading of 5 mvolts.

The SMI card is capable of providing a range of digital output values from 0 to 65K. Therefore, signal granularity may be maintained without the above described mapping scheme. The SMI card therefore, outputs a constantly defined set of output values on a range of −10.5 mvolts to 69.5 mvolts. The digital count value of 0 corresponds to −10.5 mvolts and the 65K digital count value corresponds to 69.5 mvolts. The range of possible resistance values (0 to 320 ohms) is similarly mapped to the 0 to 65K digital count value range. In both instances, the chosen maximum value is selected so that the maximum output of any device cannot reach an analog value corresponding to the maximum digital count value. The maximum count value in each case is reserved to indicate a sensor failure.

While a preferred embodiment and exemplary alternatives of the present invention have been described, many alternative embodiments of the present invention will be contemplated by those skilled in the art in view of the above described preferred embodiment of the invention. For example, while the invention has been illustrated by means of a preferred embodiment for replacing four specific processor cards in a specific industrial process control system the invention is intended to cover other configurable processor cards having sensing and configuration logic which facilitate replacing a set of distinct specific-use cards in an industrial control system. The scope of the present invention is intended to cover the disclosed preferred embodiment as well as those alternatives falling within the spirit and scope of the invention as defined by the claims appended below.

What is claimed is:

1. A configurable distributed control processor card to replace any one of a set of existing distributed control processor card types within a distributed industrial process control system, the set of existing distributed control processor card types being signally coupled to connectors in order to communicate with other components of the distributed industrial process control system via an external bus, the connectors comprising a set of lead connectors for communicatively coupling external bus lines for carrying data, address and control signals to leads of an inserted distributed control processor card, external lead definitions of the multiple existing card types being distinguishable from one another, the configurable distributed control processor card being capable of replacing any of the multiple existing processor card types and comprising in combination:

a set of external leads for coupling processor card I/O lines to the set of lead connectors configured to receive one of the set of existing distributed control processor card types;

configuration determination logic for sensing a signal on at least one of the set of external leads after the set of external leads have been signally coupled to the set of lead connectors, and transmitting a signal specifying one of a set of distributed control processor card configurations corresponding to one of the set of existing distributed control processor card types therefrom;

a processor including a set of processor signal leads; and configuration control logic, responsive to the signal specifying one of a set of distributed control processor card types, including configurable routing circuitry for selectively routing a set of signals between the set of processor signal leads and the set of external leads in accordance with the specified distributed control processor card type.

2. The configurable distributed control processor card of claim 1 further comprising a set of control programs corresponding to specific ones of each of the multiple existing card types; and wherein the configuration control logic further includes means for accessing a control program from the set of control programs in accordance with the specified distributed control processor card configuration.

3. The configurable distributed control processor card of claim 2 further comprising onboard ROM communicatively coupled to the processor address and data signal leads, the onboard ROM containing firmware comprising the set of control programs.

4. The configurable distributed control processor card of claim 2 wherein the configuration control logic further comprises steering logic signally interposed between the connector and the processor signal lines, the steering logic selectively coupling selected ones of the set of external leads to ones of the set of processor signal leads for activating maskable interrupt routines.

5. The configurable distributed control processor card of claim 4 wherein the set of signals comprise address and data signals.

6. The configurable distributed control processor card of claim 1 wherein the configuration control logic further comprises steering logic signally interposed between the connector and the processor signal lines, the steering logic selectively coupling selected ones of the set of external leads to ones of the set of processor signal leads for activating maskable interrupt routines.

7. The configurable distributed control processor card of claim 1 wherein the set of signals comprise address and data signals.

8. The configurable distributed control processor card of claim 1 further comprising a letterbug establishing a hardware identification for the configurable distributed control processor card within the distributed industrial process control system.

9. The configurable distributed control processor card of claim 1 wherein the set of existing distributed control processor card types comprise a set of SPECTRUM distributed control processor card types.

10. The configurable distributed control processor card of claim 9 wherein the set of existing distributed control processor card types comprise UCM and UIO card types.

11. The configurable distributed control processor card of claim 10 wherein the set of existing distributed control processor card types further comprise UFM and FIO card types.

12. A method for replacing any one of a set of existing distributed control processor card types within a distributed industrial process control system by means of a configurable distributed control processor card, the set of existing distributed control processor card types being signally coupled to connectors in order to communicate with other components of the distributed industrial process control system via an external bus, the connectors comprising a set of lead connectors for communicatively coupling external bus lines for carrying data, address and control signals to leads of an inserted distributed control processor card, external lead definitions of the multiple existing card types being distinguishable from one another, the method for replacing any one of the multiple existing processor card types comprising the steps of:

inserting the configurable distributed control processor card into a receptacle thus establishing communicative contact between a set of external leads for coupling processor card I/O lines to the set of lead connectors configured to receive one of the set of existing distributed control processor card types;

sensing a signal on at least one of the set of external leads after the set of external leads have been signally coupled to the set of lead connectors, and in response transmitting a signal specifying one of a set of distributed control processor card configurations corresponding to one of the set of existing distributed control processor card types therefrom; and configuring, in response to the signal specifying one of a set of distributed control processor card types, routing circuitry to selectively route a set of signals between a set of processor signal leads and the set of external leads in accordance with the specified distributed control processor card type.

13. The method of claim 12 wherein the configurable distributed control processor card includes a set of control programs corresponding to specific ones of each of the multiple existing card types, said method further comprising the step of: accessing a control program from the set of control programs in accordance with the specified distributed control processor card configuration.

14. The method of claim 12 wherein the configuring step comprises setting the connections of steering logic signally interposed between the connector and the processor signal lines, the steering logic selectively coupling selected ones of the set of external leads to ones of the set of processor signal leads for activating maskable interrupt routines.

15. The method of claim 12 wherein the set of existing distributed control processor card types comprise a set of SPECTRUM distributed control processor card types.

16. The method of claim 15 wherein the set of existing distributed control processor card types comprise UCM and UIO card types.

17. The method of claim 15 wherein the set of existing distributed control processor card types further comprise UFM and FIO card types.

\* \* \* \* \*

UNITED STATES PATENT AND TRADEMARK OFFICE
CERTIFICATE OF CORRECTION

PATENT NO.    : 5,819,050
DATED         : October 6, 1998
INVENTOR(S)   : Warren A. Boehling, Alan Merton Foskett,
                Alan Reid Wheeler It is certified that error appears in the above-identified patent and that said Letters Patent is hereby corrected as shown below:

On the Title Page, under [75] Inventors:

Change "Morton" to --Merton--.

Signed and Sealed this

Ninth Day of March, 1999

Attest:

Q. TODD DICKINSON

*Attesting Officer*                *Acting Commissioner of Patents and Trademarks*